(12) United States Patent  
Margai

(10) Patent No.: US 10,615,579 B2  
(45) Date of Patent: Apr. 7, 2020

(54) PULLING DEVICE

(71) Applicant: Wire-Holder Kft, Bér (HU)

(72) Inventor: Diána Bernadett Margai, Vác (HU)

(73) Assignee: Wire-Holder KFT, Bér (HU)

( * ) Notice: Subject to any disclaimer, the term of this patent is extended or adjusted under 35 U.S.C. 154(b) by 0 days.

(21) Appl. No.: 15/550,536

(22) PCT Filed: Feb. 15, 2016

(86) PCT No.: PCT/HU2016/050005  
§ 371 (c)(1),  
(2) Date: Aug. 11, 2017

(87) PCT Pub. No.: WO2016/128782  
PCT Pub. Date: Aug. 18, 2016

(65) Prior Publication Data  
US 2018/0034250 A1  Feb. 1, 2018

(30) Foreign Application Priority Data

Feb. 13, 2015 (HU) .................................... 1500062  
May 14, 2015 (HU) .................................... 1500231

(51) Int. Cl.  
*H02G 1/08* (2006.01)  
*F16G 11/04* (2006.01)

(52) U.S. Cl.  
CPC .......... *H02G 1/081* (2013.01); *F16G 11/048* (2013.01)

(58) Field of Classification Search  
CPC ........ H02G 1/00; H02G 1/081; H02G 1/1212; H02G 2/00; H02G 9/00  
See application file for complete search history.

(56) References Cited

U.S. PATENT DOCUMENTS 3,554,493 A * 1/1971 Bowden ................ F02K 5/00  
                                                254/134.3 FT  
4,101,114 A * 7/1978 Martin .................. H02G 1/081  
                                                254/134.3 FT (Continued)

FOREIGN PATENT DOCUMENTS

CH            706347 A2     10/2013  
CN            201411810      2/2010

(Continued)

OTHER PUBLICATIONS

International Search Report for PCT/HU2016/050005 dated Jul. 21, 2016; 3 pages.

(Continued)

*Primary Examiner* — Lee D Wilson  
(74) *Attorney, Agent, or Firm* — Fitch, Even, Tabin & Flannery LLP

(57) ABSTRACT

A pulling device (1) includes one end connectable with a draw-wire (17) and an other end connectable with one or more cable(s) (10) to be pulled. The pulling device (1) includes an inner unit (2) having a conical surface element, wherein one end of the inner unit is connectable with a draw-wire (17). The inner unit (2) is displaceable within a sleeve (7) having a conical surface element. A semi-cone angle (α) of the inner unit and sleeve conical elements is at most the angle corresponding to the self-locking angle determined by the friction coefficient of the cable (10) to be pulled. Clamping of the conical surface elements and the cables (10) therein is provided by a resilient member, preferably a spring (8).

12 Claims, 3 Drawing Sheets

(56) References Cited

U.S. PATENT DOCUMENTS

| | | | | |
|---|---|---|---|---|
| 4,684,161 | A * | 8/1987 | Egner | G02B 6/4439 |
| | | | | 254/134.3 FT |
| 4,889,320 | A | 12/1989 | Pasbrig | |
| 8,136,546 | B2 * | 3/2012 | Griffiths | F16K 17/04 |
| | | | | 137/513 |
| 2010/0051886 | A1 * | 3/2010 | Cooke | G02B 6/4465 |
| | | | | 254/134.3 R |
| 2014/0124717 | A1 * | 5/2014 | Maltby | H02G 1/083 |
| | | | | 254/134.3 R |
| 2015/0137053 | A1 * | 5/2015 | Passoni | H02G 1/081 |
| | | | | 254/134.3 R |

FOREIGN PATENT DOCUMENTS

| | | |
|---|---|---|
| DE | 2250881 A1 | 4/1974 |
| DE | 4200865 A1 | 7/1993 |
| DE | 202005006000 U1 | 4/2006 |
| EP | 234419 | 9/1987 |
| EP | 0234419 A3 | 3/1990 |
| FR | 2761542 A1 | 10/1998 |
| GB | 1064084 | 4/1967 |
| NL | 7415856 A | 3/1975 |
| WO | 2011047102 | 4/2011 |

OTHER PUBLICATIONS

Written Opinion of the International Searching Authority for PCT/HU2016/050005 dated Jul. 21, 2016; 5 pages.
Hungarian Priority Search Report for P1500231; dated Nov. 26, 2015; 1 page.

\* cited by examiner

PULLING DEVICE

CROSS-REFERENCE TO RELATED APPLICATIONS

This application is the National Stage of International Application No. PCT/HU2016/050005, filed Feb. 15, 2016, which claims the benefit of Hungarian Patent Application Nos. P1500062 filed Feb. 13, 2015, and P1500231 filed May 14, 2015.

The invention closely relates to a pulling device for drawing in electrical cables, the device can be connected between the end of a cable to be pulled and the end of a draw-wire in order to ease, accelerate, simplify and make safer the process of cable pulling. The application field of the invention includes any installation locations, where pulling of one or simultaneously even more cables (and even optical cables) into existing conduits or tubes is required.

German Publication Pamphlet no. DE 42 00 865 A1 discloses a pulling device for cable pulling that makes use of a pulling sleeve to draw in cable(s) into protecting tubes wherein the outer sheathing of the cable(s) is not traction-resistant. Strands of said pulling sleeve are drawn onto a conical core member which is then secured into a conical housing by means of a threaded pulling end. On the end of the pulling end, there is provided an eye. For cables of different sizes, the strand of appropriate size that can be pulled is attached to a cover to be adhesively joined with the end of the cable and is clamped into a pulling head. These pulling sleeves are suitable to pull one or simultaneously more cables; the sleeves have to be drawn onto the cables to be pulled, then as the consequence of pulling, said sleeves get contracted and firmly grip the cable(s).

A drawback of this solution is that it requires the insertion of a further mesh into between the cable(s) and the pulling device, which practically also requires additional reinforcement with adhesive tape.

German utility model no. DE202005006000 discloses a different solution. Here, several cables of identical size are gripped in a pulling head with a conical interior design. In the pulling head, there is provided a gripping member with an internal thread, the cable ends can be laced into the openings of the gripping member. A threaded rod for drawing in the gripping member extends through the pulling head and is provided with an eye on the end thereof. The threaded rod serves for tightening the clamped cable ends onto a cone member that is formed within the pulling head.

A drawback of this solution is that individual cables may slip out when larger forces act occasionally when pulling is performed, such cables thus have to be pulled back along with the others and then the procedure has to be repeated.

European Publication Pamphlet no. EP-0,234,419 A2 discloses a cable pulling device for drawing in telecommunications optical cables into protecting tubes that ensures the pulling in even for pulling forces of different magnitudes. The cable pulling device has an outer cable pulling element suitable for pulling with large (preferably at most 30 kN) pulling forces, wherein an inner cable pulling element suitable for pulling with smaller (preferably at most 10 kN) pulling forces is arranged within the hollow interior of said outer cable pulling element. The inner cable pulling element has a hollow sleeve that is open at both ends thereof and a hollow inner unit that is also open at both ends thereof and is seated into the sleeve, said sleeve is constructed with two halves. In its assembled position, both the outer surface of the inner cable pulling element and the entire inner surface of the sleeve form a full cone envelope surface each, and an end of the cable to be drawn in is secured into the inner cable pulling element, into the hollow of the inner unit.

The wide-spread use of cable lubricants is also known for the reduction of friction between the cable(s) to be pulled and the protecting tube/previously pulled cables and thus to reduce the risk of undesired cable breaking within the protecting tube in such cases wherein several cables are pulled simultaneously and/or the diameter of the protecting tube is expected not to be large enough or the protecting tube already contains one or more previously pulled cables.

Disadvantages of using cable lubricants are the additional material requirement for the pulling and the pollution/contamination caused by their application. Moreover, when carrying out subsequent electrical works or upgrading wiring it is practical to assume blockage to a smaller or larger extent of the protecting tubes. Thus, cable lubricants are applied anyway—just in case—even though it turns out later on that their application was superfluous.

Besides eliminating drawbacks of the known solutions, an object of the present invention is to provide a grip mechanism which immediately secures the cable, particularly more than one cables, to be pulled and provides quick release thereof, optionally by hand, after the pulling.

A further object of the invention is to provide a grip mechanism, the application of which does not require the use of cable lubricants for pulling, but provides a reliable and stable clamping of the cable, because it is capable of exerting a clamping force that also increases when the pulling force increases during pulling (e.g. due to unexpected cable jamming).

A core of the invention is that a pulling device, a cable pulling device, whose one end is configured to be connectable with a draw-wire and its other end is configured to be connectable with one or more cables to be pulled, comprises an inner unit with a conical element, one end of said inner unit can be connected with the draw-wire by means of a connector element and said inner unit can be displaced within a sleeve having conical surface elements. According to the invention, the sleeve has one closed end and the semi-cone angle of the conical elements of the inner unit and the sleeve equals to at most the angle corresponding to the self-locking angle determined by the friction coefficient of the cable to be pulled, wherein smaller diameter portion of the inner unit is configured to be connectable with the draw-wire and larger diameter portion of the inner unit is located next to the end of the cable pulling device that faces the one or more cables to be pulled; and wherein clamping of the conical surfaces and the one or more cables arranged therein is provided by a resilient member.

Major features of further preferred embodiments of the invention are set out in dependent claims 2 to 11.

In what follows, the cable pulling device is discussed in detail in relation to preferred exemplary embodiments with reference to the accompanying drawings, wherein FIG. 1 is a sectional view of an exemplary embodiment of the pulling device according to the invention;

Figure 1:
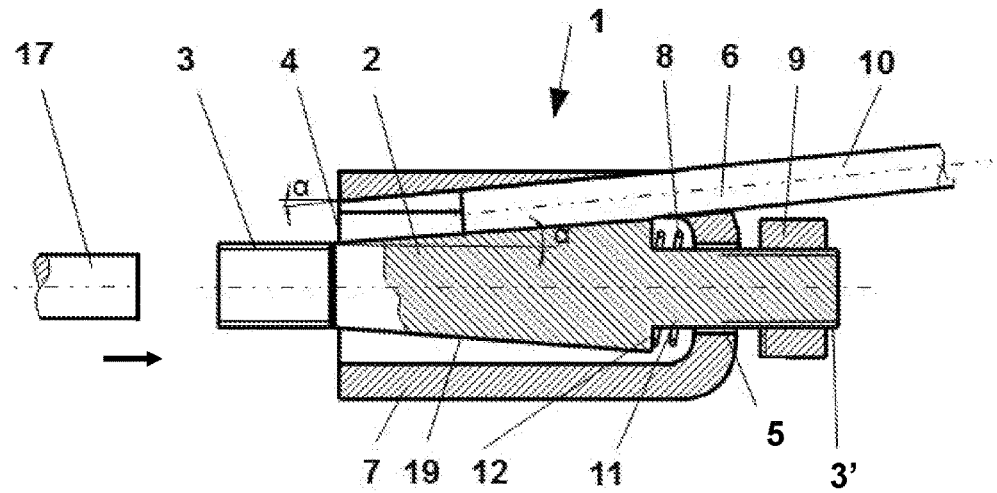

As shown in FIGS. 1, 4, 6 and 8, the pulling device according to the invention has three main parts: an elongated longitudinal hollow outer unit closed on one of its ends (from now on a sleeve 7), an inner unit 2 arranged substantially coaxially with the sleeve 7 within the internal cavity of the sleeve 7 so that it can move longitudinally within the internal cavity of the sleeve 7, and a resilient member provided by a spring 8, preferably a compression spring. Accordingly, the pulling device according to the invention provides a simple and cheap pulling device. Depending on the actual embodiment of the pulling device 1, the resilient member can be located inside or outside of the internal cavity of the sleeve 7. A purpose of said resilient member is to bias the inner unit 2 towards the closed end of the sleeve 7. Another purpose of the resilient member is to continuously clamp the sleeve 7 and the inner unit 2 and/or the ends of the at least one or more cables to be pulled that are arranged therebetween/therein, and thereby to keep the gripped cable ends in their place in operational position (i.e. during use).

The sleeve 7 can preferably be made by injection moulding or metal casting, while the inner unit 2 is preferably made by lathe machining or also metal injection moulding/casting and subsequent surface treatment. As metal, mostly low cost metal alloys, preferably aluminium/zinc (AlZn) alloys are used, however, steel or cast iron is also suitable for this purpose.

A preferred embodiment of the pulling device according to the invention aims at simplifying and accelerating electrical works. Accordingly, the biasing/clamping force exerted by the resilient member is between at least about 0.7 kN and at most about 2.5 kN, preferably about 1 kN, and thus the pulling device 1 can be conveniently operated by hand. The spring 8 is designed with a suitable spring constant.

The configuration in FIG. 1 shows the pulling device 1 in a position, wherein a stripped end of a single cable 10 to be pulled in is clamped by the pulling device 1. It can be seen in FIG. 1 that the conical surface elements 19 of the inner unit 2 are formed here as a regular cone. The inner unit 2 is arranged within the internal cavity of the sleeve 7 in such a way that its smaller diameter portion is situated at the end thereof that faces a thread 3 for connecting to a draw-wire 17, and has a semi-cone angle $\alpha$.

The semi-cone angle $\alpha$ is determined by the friction coefficient $\mu$ between the cable 10 to be pulled and the inner unit 2, as well as the sleeve 7, which basically depends on the material of said elements. For example, if the value of the friction coefficient is taken to be $\mu=0.1$ at a contact of the metallic surfaces, the semi-cone angle for self-locking will be $\alpha=5°42'5''$ based on the definition of $\mu=\tan\alpha$. Thus, the engagement between the pulling device 1 and the cable 10 can be self-locking for angles equal to (i.e. less than) this value.

In the exemplary embodiment shown in FIG. 1, the sleeve 7 has an open end 4 at the end facing the draw-wire 17 and has a cylindrical outer envelope. The opposing end of said sleeve 7 is closed, a centrally located central opening 5 is formed therein and the conical surface elements 19 are formed in the outer periphery of the sleeve 7 at the end facing the closed end as oblique holes terminating in cable openings 6. Said holes are arranged in compliance with the envelope of a theoretical cone with semi-cone angle $\alpha$. The larger diameter portion of the inner unit 2 is located at the closed end of the sleeve 7 and terminates in a shoulder 12. The shoulder 12 continues in a cylindrical portion 11 projecting longitudinally from the inner unit 2, said cylindrical portion 11 passes through the central opening 5 formed in the closed end of said sleeve 7. Here, the spring 8 forming the resilient member is disposed on the cylindrical portion 11 between the shoulder 12 and the closed end of the sleeve 7. A thread 3' is formed on the cylindrical portion 11, onto which a lock nut 9 is applied, thereby holding the pulling device 1 together by the biased spring 8. The extent to which the lock nut 9 is screwed onto the thread 3' determines the extent of bias provided by the spring 8.

It is hereby noted that a part of the surface of the inner unit 2 contacting the cable 10 is preferably roughened, in particular, it is a notched surface. Said pulling device 1 is made of hardened steel or cast iron. However, the pulling device 1 can also be manufactured from any other materials that are resistant to mechanical load (e.g. abrasive wear). Thus, the hereinbefore determined semi-cone angle $\alpha$ may differ from the given exemplary value.

Figure 2:
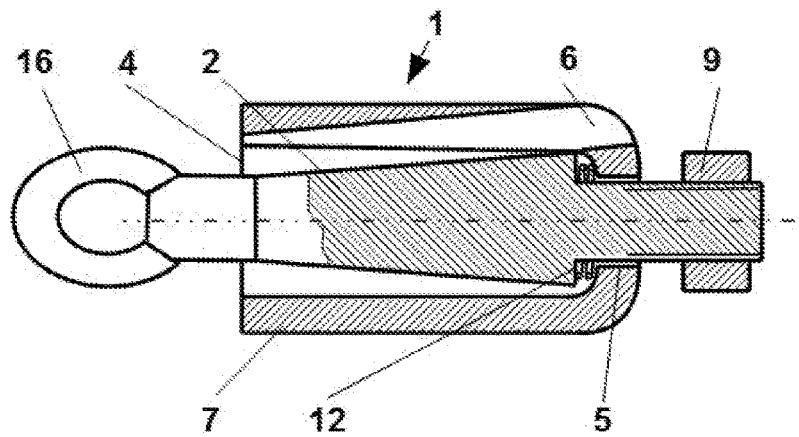
FIG. 2 is a sectional view of the exemplary embodiment of the device according to the invention illustrated in FIG. 1 in its clamping position.

FIG. 2 is a sectional view of the pulling device 1 according to the invention discussed in detail with respect to FIG. 1 in its clamping position. FIG. 1 also shows a possible further solution for connecting with the draw-wire 17. In this embodiment a shackle (not shown) providing releasable connection can be placed into the ring 16, and the pulling device 1 may be connected with the draw-wire 17 by means of that. Appropriate design of the spring 8 allows the pulling device 1 to be compressed by hand, stripped end(s) of the cable(s) 10 to be pulled in should be inserted in this position and subsequently secured at once by releasing the sleeve 7.

Figure 3:
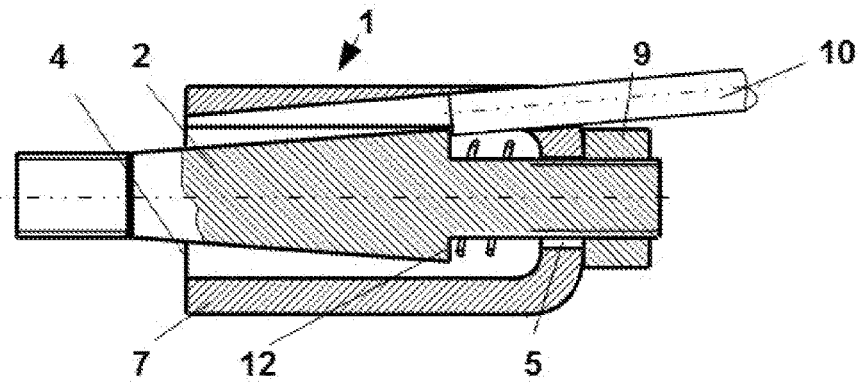
FIG. 3 is a sectional view of the exemplary embodiment of the device according to the invention illustrated in FIG. 1 in its disengaged position.

FIG. 3 is a sectional view of the previously described exemplary embodiment of the pulling device 1 according to the invention in its disengaged assembled position without a cable 10. In this position the distance between the sleeve 7 and the inner unit 2 is smaller than the diameter of the cable 10, hence to insert the cable 10, the sleeve 7 and the inner unit 2 have to be compressed towards each other along the longitudinal axis of the pulling device 1 against the force of the spring 8.

Figures 4, 5:
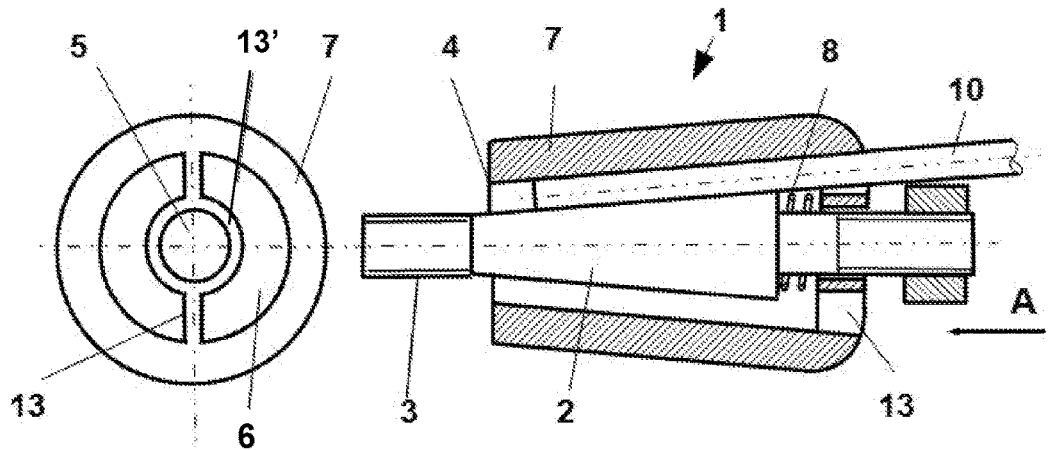
FIG. 4 is a sectional view of another exemplary embodiment of the device according to the invention.
FIG. 5 is a side elevation of the exemplary embodiment of the device according to the invention shown in FIG. 4 from side A.

FIG. 4 is the sectional view of another exemplary embodiment of the pulling device 1 according to the invention. In this embodiment the sleeve 7 is conically shaped. This embodiment can be highly preferably used for simultaneous pulling of more than three cables 10 to be pulled in. In this embodiment the cone surfaces of the sleeve 7 and the inner unit 2 are preferably roughened for a safe gripping. To enable assembling, the opening of the open end 4 of the sleeve 7 is, of course, larger than the largest diameter of the inner unit 2.

FIG. 5 is the side elevation of the exemplary embodiment of the pulling device 1 shown in FIG. 4 from side A along with the lock nut being removed. It can be clearly seen that to maximize the cable opening 6, it is formed as annular gaps in the closed end of the sleeve 7. Thus, the spring 8 is forced against a ring 13' that is secured to the rim of the sleeve 7 by a single pair of ribs 13 only, and the central opening 5 is formed in this ring 13'.

Figures 6, 7:
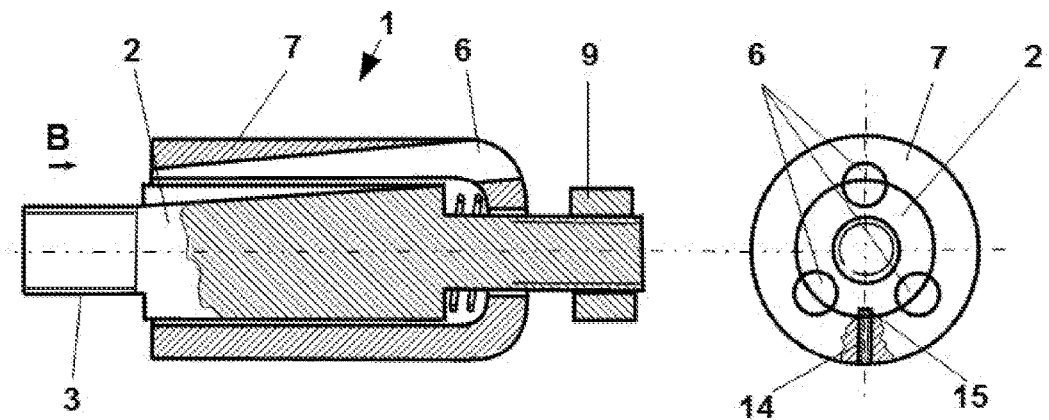
FIG. 6 is a sectional view of a further exemplary embodiment of the device according to the invention.
FIG. 7 is a side elevation of the exemplary embodiment of the device according to the invention shown in FIG. 6 from side B.

FIG. 6 is a sectional view of yet another exemplary embodiment of the pulling device according to the invention. In this variant the inner unit 2 has cylindrical surface, and here the conical element is provided by one or more cable openings 6 drilled into the inner unit 2 for the cables 10 along a theoretical cone and open from the side. Facing these, there are provided in said sleeve 7 the cable openings 6 formed as already discussed.

FIG. 7 is the side elevation of the exemplary embodiment of the pulling device 1 illustrated in FIG. 6 from side B. As the most frequent task is to pull in three cables 10 simultaneously, in FIG. 7 three cable openings 6 can be seen. As is seen in FIG. 7, the cable openings 6 corresponding to the cables 10 coincide in the sleeve 7 and the inner unit 2. According to the example, this position is secured by a fixing screw 14 that extends into a longitudinal groove 15 formed in the wall of the inner unit 2, thus the inner unit 2 and the sleeve 7 can rotate only together. As a result, the application of an embodiment shown in FIGS. 6 and 7 significantly reduces the occasional twisting of the three cables 10 during pulling, and hence after the pulling has been completed, if necessary, each of the cables 10 can be removed separately from the protecting tube (assuming, of course, that the three cables 10 do not form three strands of a single insulated cable). Furthermore, the application of the pulling device 1 shown in FIGS. 6 and 7 also eliminates the possibility of slippage of the one or more cables 10 within the sleeve 7 and thereby a loosening thereof in the pulling device 1 due to an occasional rotation of the inner unit 2 about its longitudinal axis.

Figure 8:
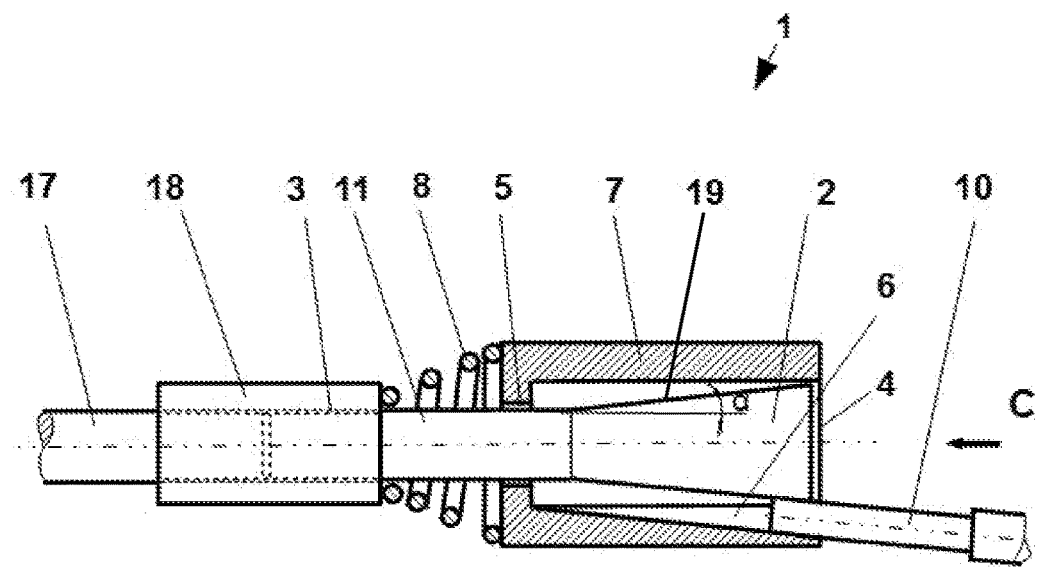
FIG. 8 is a sectional view of a yet further exemplary embodiment of the device according to the invention.

FIG. 8 is a sectional view of a yet further exemplary embodiment of the pulling device 1 according to the invention. In this variant the spring 8 is arranged outside of the internal cavity of the sleeve 7 between the sleeve 7 and a connector element 18 screwed on the thread 3 formed on the cylindrical portion 11 of the inner unit 2 passing through the central opening 5. As compared to the previously discussed variants, here, sleeve 7 is arranged in a reversed position relative to the inner unit 2. The spring 8 rests on the outer surface of the closed end of the sleeve 7, and practically has a conical design. Besides its simplicity, a further advantage of this design is that there is no obstacle (the lock nut 9) in the way of the insertion of the cable(s) 10 to be pulled. Assembly of the pulling device 1 is also simpler.

Figure 9:
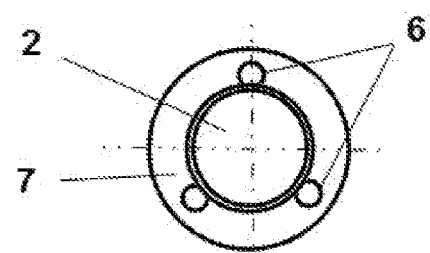
FIG. 9 is a side elevation of the device according to the invention illustrated in FIG. 8 from side C.

FIG. 9 is a side elevation of the pulling device 1 of FIG. 8 according to the invention from side C. Here, there are provided cable openings 6 as holes for pulling in only three cables 10, naturally more cable openings 6 can also be formed. An embodiment is particularly preferred, wherein an additional cable opening (not shown in FIG. 9) with a diameter differing from that of the cable openings 6 is formed between each pair of the cable openings 6. The application of this embodiment of the pulling device 1 is particularly preferred for the pulling of e.g. two different types of three-stranded insulated cables simultaneously into the same protecting tube when electrical works are performed. As can be also seen in FIG. 9, to avoid dropping out of previously inserted cable(s) 10 when inserting a yet further cable 10 into the pulling device 1, it is preferred to open up the holes on the side only to a slight extent.

It is preferred to provide a kit of the pulling device 1 according to the invention tailored to the given task. Such a kit comprises a plurality of pulling devices 1 whose design and diameter are selected in compliance with the diameter and the number of cable(s) 10 to be pulled and the diameter of the protecting tube. Said kit may also comprise the draw-wire 17 connectable with the pulling device 1.

The pulling device 1 can be used as follows. At first, the pulling device 1 is practically connected with the draw-wire 17. Then, stripped end(s) of the one or more cable(s) 10 (to be pulled) can be inserted into the cable openings 6 in the sleeve 7 into a space that is formed by compressing the spring 8 constituting the resilient member between the inner unit 2 and the sleeve 7. After the end(s) of the cable(s) 10 has/have been inserted into the cable openings 6, a release of the pulling device 1 causes the spring 8 to push automatically the inner unit 2 out of the sleeve 7, and thus to grip the inserted cable(s) 10 on the internal envelope of the sleeve 7. Now the device is ready to perform pulling.

As the force exerted on the draw-wire 17 to pull it increases during the pulling, so does the force pulling the inner unit 2, which due to the self-locking engagement clamps the one or more cable(s) 10 to the internal envelope of the sleeve 7 with larger and larger force. After pulling out the cable 10 and the pulling device 1 from the tube, the connection is loosened by pressing the inner unit 2 and the sleeve 7 together and then the cable 10 is removed from the pulling device 1.

In the exemplary embodiments shown in FIGS. 8 and 9, in order to provide enough space for inserting the cables 10, the spring 8 is compressed by pressing the sleeve 7 and the connector element 18 together. When the compression is ceased, the spring 8 provided by a compression spring keeps the cables 10 in place. Similarly to the pulling devices 1 illustrated in FIGS. 1 to 7, during pulling, the pulling force increases the clamping of the cables 10.

The invention provides a solution for eliminating the need of simultaneous securing of the cables to be pulled in the pulling device; instead, the invention allows to secure the cables one by one from cable opening to cable opening. Moreover, an increase in the pulling force acting on the cables clamped in the pulling device according to the invention induces an increase in the clamping force acting on said cables.

The invention claimed is:

1. A pulling device with one end configured to be connectable with a draw-wire and other end configured to be connectable with one or more cable(s) to be pulled, said pulling device comprising:
   a sleeve having an internal conical surface element,
   an inner unit with a conical surface element, one end of said inner unit being connectable with the draw-wire using a connector element, said inner unit being displaceable within the sleeve,
   a resilient member arranged within the pulling device to clamp the one or more cable(s) (10) between the internal conical surface element and the inner unit's conical surface element;
   wherein one end of said sleeve (7) is closed,
   wherein a semi-cone angle ($\alpha$) of the conical surface elements of the inner unit (2) and the sleeve (7) is at most a self-locking angle determined by a friction coefficient of the one or more cable(s) (10) to be pulled;
   wherein a smaller diameter portion of the inner unit (2) is configured to be connectable with the draw-wire (17) and a larger diameter portion of the inner unit (2) is located by an end of said pulling device (1) that faces the one or more cables (10) to be pulled.

2. The pulling device according to claim 1, wherein the larger diameter portion of the inner unit (2) forms a shoulder (12) and then continues in a cylindrical portion (11) with a diameter that is smaller than that of said larger diameter portion of the inner unit (2);
   wherein said sleeve (7) comprises a closed end and an opposing open end (4), the closed end has a central opening (5) with the cylindrical portion (11) of the inner unit (2) extending therethrough;

wherein the resilient member comprises a spring (8) arranged between the shoulder (12) of the inner unit (2) and the sleeve (7);

wherein said cylindrical portion (11) of the inner unit (2) is provided with a thread (3') outside of said sleeve (7) and a lock nut (9) is screwed on said thread (3') so as to provide a stop against a force exerted by said spring (8);

wherein for the one or more cable(s) (10) to be pulled, one or more cable openings (6) are formed in the sleeve (7), individual ones of the one or more cable openings (6) having a size that corresponds to that of the one or more cable(s);

wherein the one or more cable openings (6) pass through the sleeve (7) at an outer periphery thereof.

3. The pulling device according to claim 1, wherein the sleeve (7) is configured to be fully conical, and the sleeve's open end (4) is larger than a largest diameter of the inner unit (2).

4. The pulling device according to claim 1, wherein envelopes of the inner unit (2) and the sleeve (7) are cylindrical and one or more cable openings (6) are formed therein in compliance with the semi-cone angle ($\alpha$); the sleeve (7) and the inner unit (2) is provided with a fixing screw (14) and a groove (15) that allow longitudinal displacement between said sleeve (7) and said inner unit (2).

5. The pulling device according to claim 1, wherein connection to the draw-wire (17) is provided by a thread (3) and a connector element (18).

6. The pulling device according to claim 1, wherein the inner unit (2) is configured to be connectable with the draw-wire by a ring (16) and a shackle providing releasable connection.

7. The pulling device according to claim 2, wherein the smaller diameter portion of the inner unit (2) is directed through the central opening (5) of the closed end of the sleeve (7); wherein an end of said sleeve (7) opposite of the closed end is an open end (4), said spring (8) is arranged between an outer face of said closed end of the sleeve (7), and the connector element (18) is connected with the draw-wire (17); wherein the one or more cable(s) (10) pass through at the open end (4) of the sleeve (7).

8. The pulling device according to claim 1, wherein portions of the conical surface elements contacting the one or more cable(s) (10) are roughened or notched surfaces.

9. The pulling device according to claim 1, wherein the inner unit (2) is made of hardened steel or cast iron, and the sleeve (7) is made of a metal.

10. The pulling device according to claim 2, wherein the one or more cable openings (6) include three cable openings and each cable opening (6) has a same diameter.

11. The pulling device according to claim 2, wherein the one or more cable openings (6) include six cable openings, each cable opening (6) has a diameter, said diameters alternating between a first diameter and a second diameter smaller than the first diameter as the cable openings (6) are considered circularly and sequentially.

12. The pulling device according to claim 9 wherein the sleeve (7) is made of one of a group comprising steel, cast iron, or aluminum/zinc alloy.

* * * * *